US008366525B2

(12) United States Patent
Jensen

(10) Patent No.: US 8,366,525 B2
(45) Date of Patent: Feb. 5, 2013

(54) COMBAT SIMULATION GAMING SYSTEM

(76) Inventor: Rick Jensen, North Prairie, WI (US)

( * ) Notice: Subject to any disclaimer, the term of this patent is extended or adjusted under 35 U.S.C. 154(b) by 1003 days.

(21) Appl. No.: 12/338,560

(22) Filed: Dec. 18, 2008

(65) Prior Publication Data

US 2010/0093414 A1 Apr. 15, 2010

Related U.S. Application Data

(60) Provisional application No. 61/105,481, filed on Oct. 15, 2008.

(51) Int. Cl.
*A63F 9/24* (2006.01)
(52) U.S. Cl. .................. 463/5; 463/7; 463/31; 463/37; 463/42; 463/43
(58) Field of Classification Search .................. None
See application file for complete search history.

(56) References Cited

U.S. PATENT DOCUMENTS

| 3,898,747 | A | | 8/1975 | Marshall |
|---|---|---|---|---|
| 5,320,362 | A | | 6/1994 | Bear et al. |
| 5,516,113 | A | * | 5/1996 | Hodge ..................... 273/371 |
| 5,785,592 | A | | 7/1998 | Jacobsen |
| 5,904,621 | A | | 5/1999 | Small et al. |
| 6,248,019 | B1 | | 6/2001 | Mudie et al. |
| 6,254,486 | B1 | | 7/2001 | Mathieu et al. |
| 6,322,365 | B1 | | 11/2001 | Shechter et al. |
| 6,569,011 | B1 | | 5/2003 | Lynch et al. |
| 6,966,775 | B1 | | 11/2005 | Kendir et al. |
| 2003/0027640 | A1 | | 2/2003 | Jeffway, Jr. et al. |
| 2003/0060288 | A1 | | 3/2003 | Oakes |
| 2003/0228914 | A1 | | 12/2003 | Abe |
| 2006/0287113 | A1 | | 12/2006 | Small et al. |
| 2008/0194337 | A1 | | 8/2008 | Hensel |
| 2009/0017913 | A1 | * | 1/2009 | Bell et al. ..................... 463/40 |
| 2010/0093436 | A1 | | 4/2010 | Lander |
| 2010/0279768 | A1 | * | 11/2010 | Huang et al. ..................... 463/31 |
| 2011/0214499 | A1 | * | 9/2011 | Hodge ..................... 73/167 |

FOREIGN PATENT DOCUMENTS

| EP | 1632744 A1 | 8/2006 |
|---|---|---|
| WO | 0053996 A1 | 9/2000 |
| WO | WO2008/074082 A1 | 6/2008 |

* cited by examiner

*Primary Examiner* — David E Graybill

(57) ABSTRACT

The present invention is a system for conducting a combat simulation game in which each player is outfitted with equipment enabling data concerning the game play ability of the player to be transmitted to a local server for use in computing a player performance data for individual players in comparison with all other players having data stored within the system. The equipment transmits various data to the server which is utilized by the server to update the player performance data in a real-time manner that can be accessed and viewed by other players from remote locations.

9 Claims, 4 Drawing Sheets

COMBAT SIMULATION GAMING SYSTEM

CROSS-REFERENCE TO RELATED APPLICATION

This application claims priority from U.S. Provisional Patent Application Ser. No. 61/105,481, filed on Oct. 15, 2008, the entirety of which is expressly incorporated by reference herein.

FIELD OF THE INVENTION

The present invention relates to combat simulation games, and more specifically to a system and apparatus to conduct a game and to relay information about the game play of an individual to a central processing unit.

BACKGROUND OF THE INVENTION

In prior art combat simulation games, such as laser tag and paintball games, players attempt to "shoot" one another with beams of light or projectiles to remove players from an opposing team from the game. When struck with a paintball, the resulting spot of paint on the player indicates that the player has been hit and must be removed from active game play. When beams of light are utilized as the simulated projectile, the light beam strikes a suitable receiver on or worn by the player, which senses the beam and provides an indication that the player has been struck by the beam, such as by energizing a light on the player.

While both of these systems of playing combat simulation games are adequate to effectively play the game, each has certain deficiencies. For example, when utilizing paintballs as the projectile, sometimes the paintball will not break upon striking an individual, so the player is incorrectly not removed from the game, or will break on a non-player object, such as a tree or other structure used in the game play, and will splatter onto the player, resulting in the player being incorrectly removed from the game.

The use of IR or laser beams overcomes certain of these problems because the beams will not bounce off of objects or players, reducing the occurrences of incorrect results concerning the removal of a player. However, even when using IR or laser beams certain problems arise, such as the limited number of locations available on the player to receive and register the IR or laser beam due to the weight of the receivers.

Additionally, regardless of the manner of projectile utilized in the game play, one significant deficiency in the manner of game play arises in the ability to effectively monitor the game play as it is occurring, as well as to rank individual player on their performances during game play. While it is currently possible to track the performance of a player based on the length of time a player remains in the game, and the number of kills a player makes through observations of the player during game play, it is desirable to develop a gaming system that allows for a more complete analysis of the game play of an individual, and to also enable that analysis to be utilized in ranking the player more accurately based on the actual game play of the individual as it is occurring, which can also be compared to and viewed by other players.

Therefore, it is desirable to develop a system to be utilized in playing a combat simulation game that provides the capability to monitor the game play of an individual player, while also enabling the game play statistics to be recorded and viewed by other individuals who are not participating in the game play, to provide detailed player performance data for individuals playing the game with one another as well as with other players who are not participating in the present game play, but have participated in prior recorded game play on the system.

SUMMARY OF THE INVENTION

According to one aspect of the present invention, each player participating in the simulated combat game is outfitted with a gun including an infrared (IR) beam transmitter and a receiver that includes a display thereon. The transmitter is capable of sending out encoded IR beams that identify the player from which they came, such that when an opposing player is struck by the beam, the receiver on that player can register the beam as coming from the specific player. In addition, the receiver for each player transmits a record of the shot that was made and the hit to a central command server which registers the hit on the player, and the player who shot the beam. Thus, the central command server can register automatically all of the shots taken and corresponding hits made during game play corresponding to who was hit and who made the shot in a highly accurate manner. This information can also be displayed directly on the displays of both the player who made the shot and the player who was struck to provide an indication of the successful hit.

Furthermore, the transmitter on the gun is operably connected to the receiver, such that each time a player depresses the trigger of the gun to attempt a shot on another player, the gun transmits a signal to the central command server of the particular shot, regardless of whether the shot results in a hit in an opposing player. In this manner, the number of shots taken by an individual player is recorded by the server in addition to the number of hits made by that particular player.

According to another aspect of the present invention, both during and after game play, the central command server is operably connected to the Internet, such that the results being transmitted to the central command server are available for review in a real-time manner by other players in a variety of locations.

According to still another aspect of the preset invention, the results received by the system from the individual players can be reviewed and used to compute relative player performance data, such as rankings, for the various players in the system in the same real-time manner. The system also allows for the game play statistics and results utilized in the computation of the player performance data to be received from multiple combat simulation game sites at which separate but simultaneous game play is occurring. In addition, other players at remote locations that are not participating in a combat simulation game can access the system to watch a particular game as it is being played by reviewing the real time results obtained by the central command server from the game play site or sites. This watching of a game via the central command server can further be enhanced through the use of a location tracking, such as triangulation or global positioning satellite system (GPS), in conjunction with each player at a particular site, such that the server can provide a graphical representation of the relative positions of each player in the game to a person viewing via the Internet.

Numerous other aspects, features and advantages of the present invention will be made apparent from the following detailed description, taken together with the drawing figures.

BRIEF DESCRIPTION OF THE DRAWINGS

The drawing figures illustrate the best mode currently contemplated of practicing the present invention.

In the drawings.

DETAILED DESCRIPTION OF THE INVENTION

Figure 1:
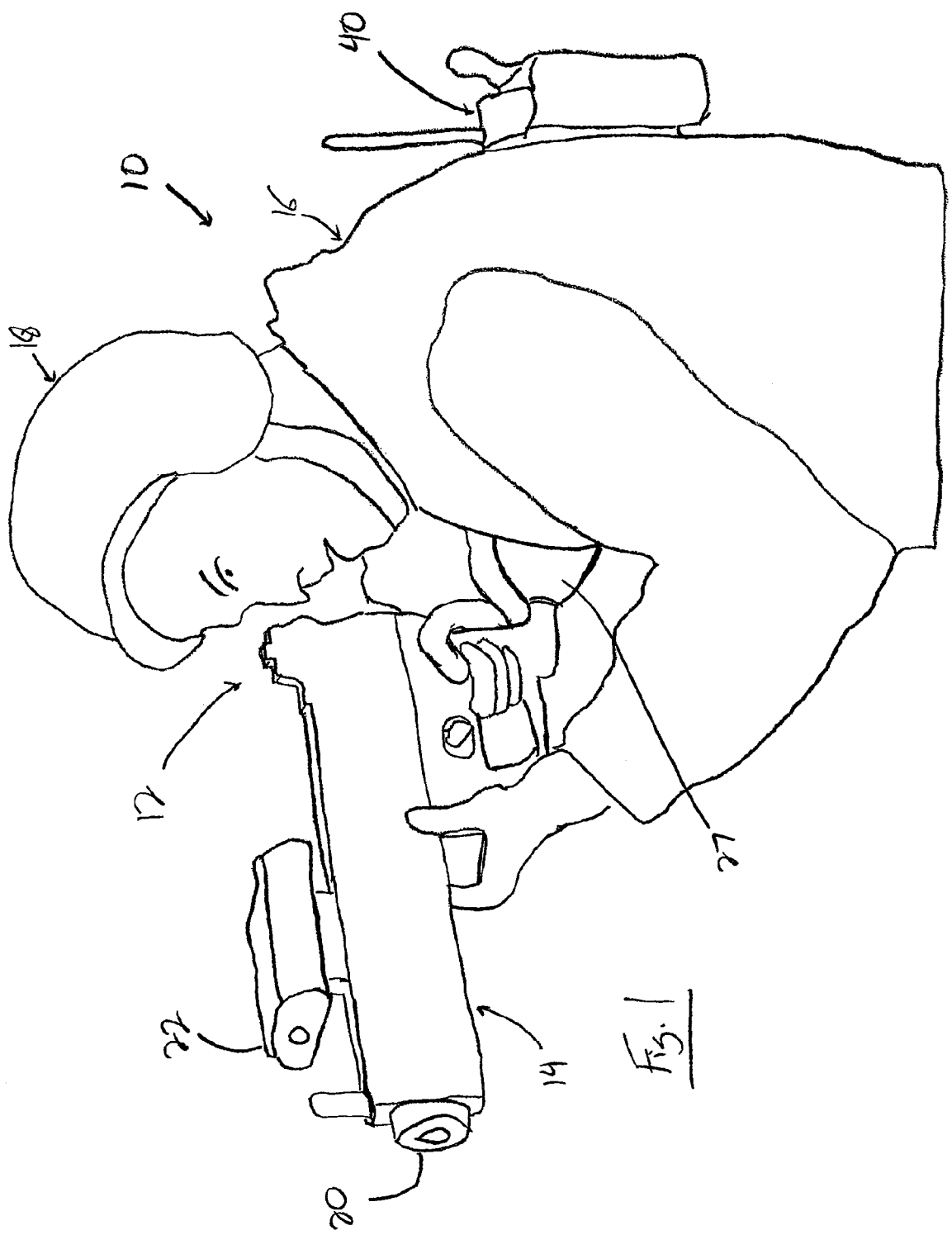
FIG. 1 is a perspective view of a gun and player equipment used in the gaming system of the present invention.

With reference now to the drawing figures in which like reference numerals designate like parts throughout the disclosure, a player 10 participating in a combat simulation gaming system constructed according to the present invention is illustrated in FIG. 1. The equipment 12 utilized by the player 10 to participate includes a marker or gun 14, and optionally one or more of a vest 16 or other garment worn on the torso of the player 10, and a helmet 18.

Figure 2:
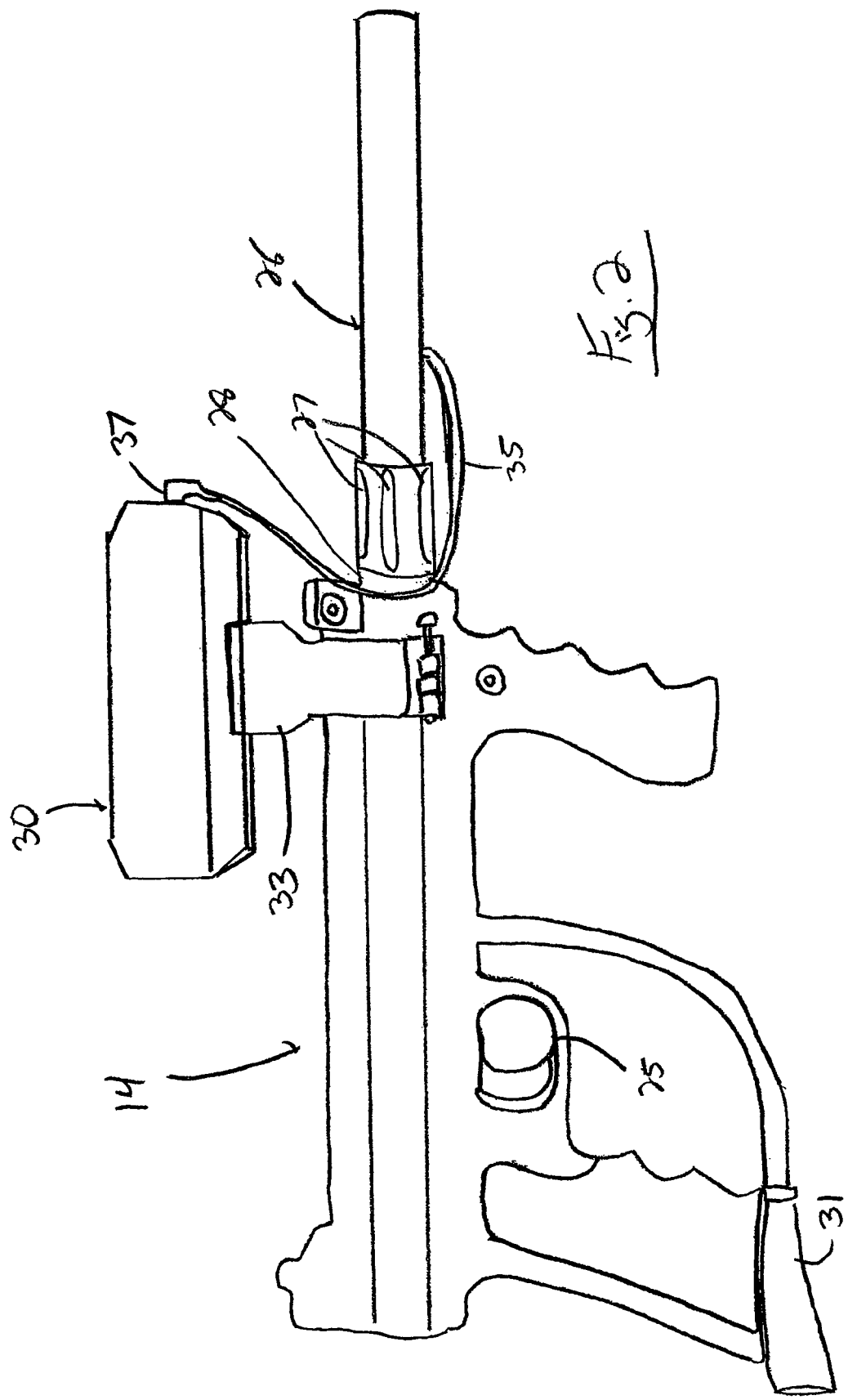
FIG. 2 is an isometric view of a second embodiment of the gun of FIG. 1.
Figure 3:
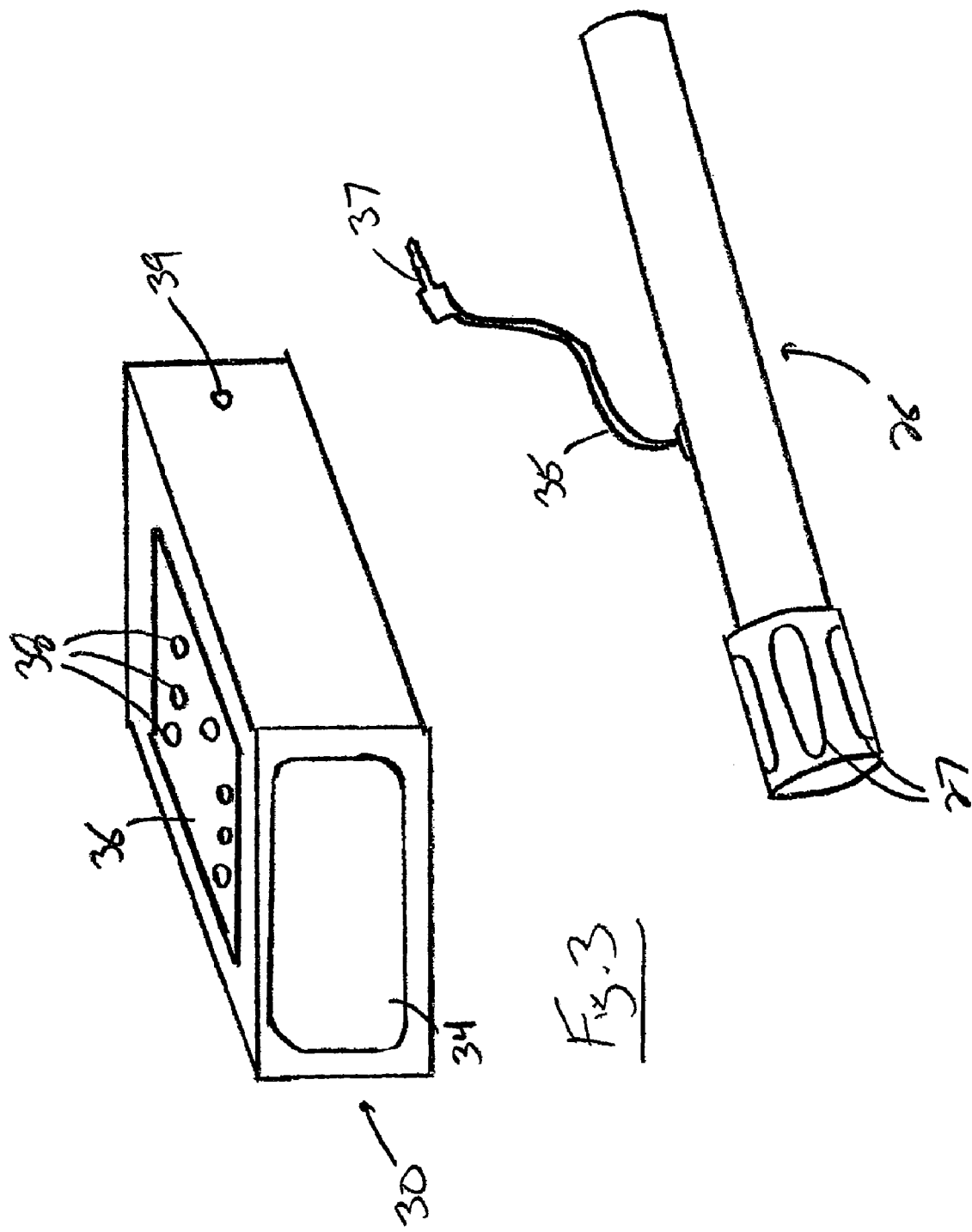
FIG. 3 is an isometric view of a gun adapter set used in the system of FIG. 1.

The gun 14 can be any suitable firearm that is originally constructed or retrofit to include an infrared (IR) transmitter 20 and a receiver 22, which can be integral or separate from one another o the gun 14. The transmitter 20 and receiver 22 can also be configured to operate using a diode package or a laser package using a laser of different frequencies, and/or by transmitting and receiving data using radio frequency (RF) wireless communications preferably in conjunction with the IR beam transmission. In a preferred embodiment, the gun 14 is a conventional paintball marker 24, best shown in FIGS. 2 and 3, which is retrofit by attaching an IR emitting barrel 26 to the barrel 28 of the marker 24, and an electronic hopper receiver and display 30 in place of a conventional paintball hopper (not shown).

The IR emitting barrel 26 is adapted to be attached, e.g., slid directly over and engaged, with the barrel 28 of the marker 24, with the emitting end 32 of the barrel 26 being positioned over the outlet end (not shown) of the marker barrel 28. Any suitable engagement means 29 can be employed on the barrel 26 to hold the emitting barrel 26 on the marker barrel 28, such as a clamp, screw, frictionally-engaging member or other suitable device that enables the emitter barrel 26 to remain secured to the marker 24 while in use. Additionally, any suitable IR or other wavelength beam emitter (not shown) can be disposed within the emitter barrel 26, such that the emitter is positioned in substantial axial alignment with the longitudinal axis of the marker barrel 28, to ensure that beams emitted from the emitter barrel 26 travel along the path indicated by the axis of the marker barrel 28.

To operate the emitter barrel 26, the barrel 26 is coupled to the marker 24 in a manner that enables the barrel 26 to sense the depressing of the trigger 25 of the marker 24, and consequently emit an IR beam in response to the depression of the trigger 25. This connection between the trigger 25 and the emitter barrel 26 can be made in any suitable and available manner, such as by utilizing a sensor (not shown) operably connected to the trigger 25 and to the emitter barrel 26 to sense the motion of the trigger 25 and operate the emitter barrel 26. However, in a preferred embodiment, the marker 24 including the emitter barrel 26 is utilized with a compressed gas canister 27 (FIG. 1) attached to the marker 24 in a conventional manner via a suitable coupling 31. Thus, when the trigger 25 is depressed by a player 10, the compressed gas, (e.g., carbon dioxide, nitrogen, air, or other inert or hydrocarbon gases, among others) released from the canister 27 due to the normal operation of the marker 24 passes through the marker barrel 28 and optionally at least a portion of the emitter barrel 26, such as a portion of the emitter barrel 26 that is positioned within the marker barrel 28. The emitter barrel 26 is configured to sense the pulse of carbon dioxide passing through the barrel 28, such as by a suitable sensor (not shown) disposed in the marker barrel 28 or to sense the vibration caused by the air or gas travelling through the barrel 28 of the gun 14, such as through the use of a suitable device or sensor, e.g., an accelerometer (not shown), and to emit an IR beam at the time the gas pulse or vibration is sensed. In this manner, the emitter barrel 26 enables the marker 24 to be used in a conventional configuration, thereby retaining the sounds, recoil and other feel characteristics of the conventional operation of the marker 24.

The receiver and display 30 is mounted to the marker 24 in any suitable manner and preferably by using the same connection present on the marker 24 to attach a paintball hopper (not shown) to the marker 24, such as a clamp 33. The receiver and display 30 includes a suitable internal power source (not shown) as is known, which can be a removable and replaceable source, such as a battery, or a rechargeable and permanent power source retained within the receiver and display 30.

The receiver and display 30 further includes an internal receiver/transmitter (not shown) as is known that is capable of receiving and recording signals in the form of IR beams, such as from the emitter barrel 26, and to send and receive information from other sources using wireless RF transmissions. The data sent and received from the receiver and display 30 can be viewed on a display 34 positioned at one end of the receiver and display 30, and preferably in allocation that is readily viewable by a player 10 utilizing the marker 24. The particular data shown in the display 34 can be changed through the use of a control panel 36 disposed on the receiver and display 30, such that a player 10 can locate the desired information on the display 34. The control panel 36 can also include buttons or switches 38 that provide other functions to the control panel 36, such as to turn power to the receiver and display 30 on and off, among others.

The receiver and display 30 is additionally operably connected to the IR emitting barrel 26, such as via a cable 35 and pin 37 connected to the barrel 26 that is insertable within a receptacle 39 on the receiver and display 30, in order to function as a power supply for the barrel 26, and to monitor the operation of the barrel 26 in manner to be described.

In addition the marker 24, emitter barrel 26 and receiver and display 30, as shown in FIG. 1, the player 10 can also be outfitted with a vest or other suitable garment 16, and a helmet 18. The vest 16 is formed of any suitable fabric or other material and includes one or more wireless receiver/transmitters 40. The receiver/transmitter 40 is configured to detect or receive IR beams emitted by the guns 14 of other players 10, and to transmit and receive RF data. To assist in detecting IR beams striking the vest 16, multiple receiver/transmitters 40 can be disposed on the vest 16, in any location on the vest 16. The receiver/transmitter 40 can also function to relay RF data to and from the receiver and display 30 on the marker 24, to increase the speed of communication of the RF data, and to reduce the interference created by multiple players 10 by increasing the communication bandwidth, such that up to one thousand players 10 can participate in a single combat simulation game.

The helmet 18 is configured similarly to the vest 16, with a receiver/transmitter (not shown) used to detect IR beams and to transmit and receive RF data. In addition, the helmet 18 can also be constructed to include other features, such as a headset (not shown) with microphone and speaker (not shown) to enable the helmet 18 to facilitate communication between players 10 on a team. Also, the helmet 18, or the vest 16, can be configured with a location or GPS position-tracking device (not shown) in a known manner, such that it is possible to determine the exact location of a player 10 during the game play. In addition, the helmet 18 can be configured as another suitable type of headgear, or as a band (not shown) or other suitable device that can be attached to an existing helmet, hat or other type of headgear.

Figure 4:
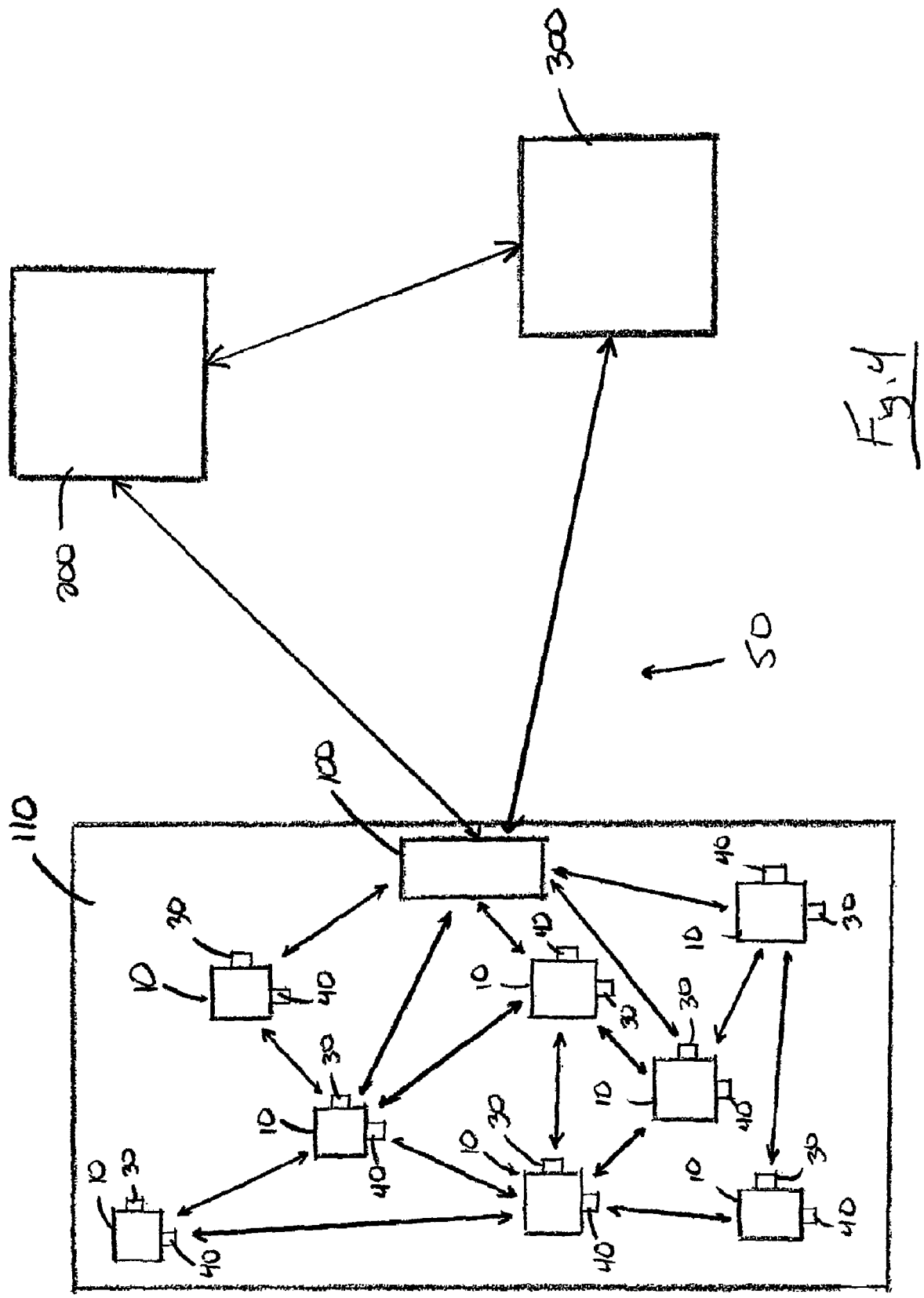
FIG. 4 is a schematic view of the game play system of the present invention.

Referring now to FIG. 4, when participating in a combat simulation game, the player 10 uses the gun 14 to target and shoot at opposing players 10. When a player 10 takes a shot, in addition to the operation of the emitter barrel 26 described above, the beam emitted from the gun 14 is "marked" with an identifier unique to the individual player 10. Thus, when an opposing player 10 is struck by the beam, i.e., one of the receivers 30 or 40 on the player 10 being shot at registers the beam striking the receiver 30 or 40, the various receivers 30 and 40 on the opposing player 10 can not only register the hit, but also identify the player 10 who took the shot. Further, the transmitter 30 or 40 on the player 10 who was hit also transmits a signal back to the player 10 who took the shot, as well as to other players 10 involved in the game on each team, that the shot was successful, thus changing the status of the "shot" player 10 with regard to the continuing combat simulation game. All of this information can then be viewed on the display 34 to provide a visual indication of the status of the game, in addition to other relevant information on the game play, such as the type of game being played, the time elapsed in the game play, and the operating characteristics of the marker 24, if the characteristics are available to be changed, among others.

In addition to transmitting information concerning the hits on various players 10 between the receivers and transmitters 30 and 40 on each player 10, if the players 10 are also equipped with position or GPS locators, the transmitters 30 and 40 can also send information concerning the location of other team members, which can be represented on the display 34.

Apart from information being relayed between the various players 10 involved in the simulation combat game, all of this information can also be relayed by one of the transmitters 30 or 40 to a system 50 including a local receiving server 100 located at the particular gaming location 110. Further, in addition to the data concerning the hits and status of the individual players 10, information can be forwarded from each of the receiver and displays 30 concerning the number of shots taken by an individual player 10. This is accomplished by the receiver and display 30, which can record each instance of the trigger 25 being activated, and sends a corresponding signal to the server 100 indicating the shot was fired, regardless of whether there is a subsequent signal sent from the receiver/transmitters 30 or 40 on an opposing player 10 indicating the shot was successful. Also, not only will players 10 send their individual scores to the server 100 for calculation, the server 100 will be configurable to change the game play while the game is actually in progress. This can be accomplished by the server 100 by sending commands to individual receiver/transmitters 30 and 40 on each player 10, among other manners. Further, the server 100 also receives signals representing the particular locations of each player 10, such that the server 100 can send signals to the players 10 to illustrate the locations of selected players 10, such as a the teammates of a player 10, on the display 34 for that player 10, as well as to other viewing sources, as will be described. In addition, it is possible for the information to be transmitted to the server 100 on a periodic basis, such that the server 100, if necessary, has sufficient time to process all of the data transmitted to it via the various sources.

Within the system 50, all of this information received by the server 100 can then be routed to a remote central command server 200. At this server 200, the information can be utilized to compile player performance data for each player 10, which can be based in part on any number of data received concerning the game play of the particular player 10, including, but not limited to, the number of shots taken, the number of successful shots, the length of time spent in an active role in game, etc. This data can be combined with other data recorded within the server 200 from previous combat simulation games for the individual player 10 to create more detailed player performance data, e.g., a ranking, for the player 10 with regard to other players 10 having profiles for game play stored within the system 50 on the server 200. The profiles for each player 10 can be created on the system 50 and stored in the server 200 in any suitable and known manner, e.g., such as by having the player 10 purchase a subscription enabling the player 10 to access and create a profile on the system 50, in order to provide the ability for the information about the particular player 10 to be stored in the appropriate location on the system 50, i.e., the profile of the player 10, in manner that enables the player 10 to access and view the records stored on the system 50. The player performance data can be compiled in the system 50 by the server 100 and/or 200 to form an overall ranking for the payer 10, or multiple rankings for the various individual aspects of the data collected in the servers 100 and/or 200, including, but not limited to, the number of shots taken, the number of successful shots, and the length of time spent in an active role in game, among others.

In addition, the server 200 can be operably connected to multiple servers 100, such as via the Internet, in order to receive and compile information on players 10 from multiple gaming locations 110 either sequentially or simultaneous to create a real-time ranking system. With this ranking system, it is possible for players 10 who are registered or otherwise enabled to access the system and/or server 200 to review the player rankings for themselves and for other players 10 from all over the world.

Further, based on the real-time transmission of the data from the players 10 to the server 100 and to the server 200, it is also possible for players in remote locations 300 to access the server 200 via the Internet and get real-time updates to the player rankings based on game play being conducted at the locations at which the players 10 are located. The data supplied from the players 10 participating in the game can be compiled and used by the server 200 to update the rankings as the game is being played, and to enable a player logged onto the server 200 from a remote location to view the changes in the rankings as they occur. The rankings can be broken down by teams, individual fields or games or set of games, state level, national level, and worldwide ranking, among other possible group or individual ranking divisions.

In addition, for game play situations where the players 10 are equipped with GPS locators, the server 200 can also provide a real-time schematic view of the game play as it occurs using the triangulation or GPS locators for each player 10 that send signals to the server 100, as discussed previously. Alternatively, if one or more players 10 are equipped with video cameras (not shown) it will be possible to provide a video feed from one or more of the cameras to a remote player through the servers 100 and 200 to give a live video view of the game.

In another adaptation of the system 50, the game play can be altered through the use of various electronic props (not shown). These props may include but will not be limited to: helmets, land mines, grenades, detonation devices, tanks, etc. Each individual prop will also have the ability of being able to interact wirelessly with individual receiver/transmitters 30 and 40 on each player 10 and also the server 100 at each gaming site 110.

The foregoing description is merely illustrative of the present invention and various alternatives are contemplated as being within the scope of the present invention though not specifically discussed herein.

The invention claimed is:

1. A method of determining the player performance of a player in a simulated combat game, the method comprising the steps of:
   a. providing a simulated combat game system including at least one beam emitting device adapted to be used by a player participating in the game, at least one beam detecting device adapted to be used by another player participating in the game, at least one transmitting device operably connected to at least one of the at least one beam emitting device or the at least one beam detecting device, and at least one central processing unit configured to receive signals from the at least one transmitting device and compile player performance data for individual players therefrom;
   b. sending signals from the at least one beam emitting device or the at least one beam receiving device via the at least one transmitting device to the at least one central processing unit; and
   c. compiling the signals in the central processing unit to create the player performance data, wherein the step of compiling the signals into the player performance data comprises the steps of:
      i. determining a number of player performance values from the signals; and
      ii calculating a comparative player value based on the player performance values, and
   wherein the step of calculating the comparative player value comprises using the comparative player value to form a ranking in comparison with comparative player values of other players, and wherein the step of determining the player performance values includes determining the length of time spent by a player in an active role in the game.

2. The method of claim 1 wherein the step of displaying the real-time ranking comprises displaying the ranking to subscribers to the system.

3. The method of claim 1 wherein the system includes at least one remote computing device configured to access the at least one central processing device to view the player performance data, the method further comprising the step of viewing the player performance data from the remote computing device.

4. The method of claim 3 further comprising the steps of:
   a. transmitting the player performance data from the at least one central processing unit to the at least one remote computing device; and
   b. storing the payer performance data in the at least one remote computing device.

5. The method of claim 1 wherein the step of compiling data comprises compiling data from multiple beam emitting devices and multiple beam receiving devices.

6. The method of claim 5 wherein the step of compiling data comprises compiling data from multiple beam emitting devices and multiple beam receiving devices at multiple geographic locations.

7. The method of claim 6 wherein the step of compiling data comprises compiling data in multiple central processing units at multiple geographic locations.

8. The method of claim 7 wherein the system includes at least one remote computing device configured to access the at least one central processing device to view the player performance data, the method further comprising the step of transmitting the comparative player data to the at least one remote computing device.

9. The method of claim 1 wherein the step of using the comparative player value to form a ranking in comparison with comparative player values of other players is performed in real-time.

* * * * *